(12) United States Patent
Lund et al.

(10) Patent No.: US 9,047,250 B2
(45) Date of Patent: Jun. 2, 2015

(54) FAILOVER PROCESSING

(71) Applicant: Metaswitch Networks Ltd., Enfield (GB)

(72) Inventors: Christian Lund, London (GB); Michael John Birmingham, London (GB)

(73) Assignee: METASWITCH NETWORKS LTD, Enfield (GB)

( * ) Notice: Subject to any disclaimer, the term of this patent is extended or adjusted under 35 U.S.C. 154(b) by 172 days.

(21) Appl. No.: 13/771,432

(22) Filed: Feb. 20, 2013

(65) Prior Publication Data

US 2013/0227339 A1    Aug. 29, 2013

(30) Foreign Application Priority Data

Feb. 29, 2012  (GB) .................................. 1203571.3

(51) Int. Cl.
   *G06F 11/00*  (2006.01)
   *G06F 11/20*  (2006.01)

(52) U.S. Cl.
   CPC ........ *G06F 11/2023* (2013.01); *G06F 11/2038* (2013.01); *G06F 11/2046* (2013.01)

(58) Field of Classification Search
   USPC ................................ 714/4.1, 4.11, 10–13, 43
   See application file for complete search history.

(56) References Cited

U.S. PATENT DOCUMENTS

| | | | |
|---|---|---|---|
| 5,473,599 A | 12/1995 | Li et al. | |
| 6,728,897 B1 * | 4/2004 | Cramer et al. | 714/6.1 |
| 6,941,396 B1 | 9/2005 | Thorpe et al. | |
| 7,062,676 B2 * | 6/2006 | Shinohara et al. | 714/15 |
| 2006/0190760 A1 * | 8/2006 | Saika | 714/4 |
| 2009/0307522 A1 * | 12/2009 | Olson et al. | 714/4 |
| 2010/0166020 A1 | 7/2010 | Rantsevitch | |
| 2012/0124413 A1 * | 5/2012 | Bauer et al. | 714/4.11 |

FOREIGN PATENT DOCUMENTS

| | | |
|---|---|---|
| WO | 00/11553 A1 | 3/2000 |
| WO | 2006/019744 A2 | 2/2006 |

\* cited by examiner

*Primary Examiner* — Yolanda L Wilson
(74) *Attorney, Agent, or Firm* — EIP US LLP

(57) ABSTRACT

A method of providing failover processing between a first element and a second element in a data communications network, the method comprising configuring a first channel and a second channel between the first and second elements, the first and second channels comprising different physical data paths, receiving at the first element, via the first channel, first data signals representative of functioning statuses of the second element, the first channel being configured to allow a non-optimal, partly functioning status of the second element to be communicated to the first element; and receiving at the first element, via the second channel, second data signals representative of functioning statuses of the second element, the second channel being configured to allow a failed functioning status of the second element to be communicated to the first element; and conducting failover processing based on both the first and second data signals.

30 Claims, 5 Drawing Sheets

FAILOVER PROCESSING

CROSS-REFERENCE TO RELATED APPLICATIONS

This application claims priority to foreign Patent Application No. GB 1203571.3, filed on 29 Feb. 2012, the disclosure of which is incorporated herein by reference in its entirety.

TECHNICAL FIELD

The present invention relates to a method of providing failover processing, in particular, but not exclusively, between a first element and a second element.

BACKGROUND

In electronic networks, an element performing a data processing function may fail. In anticipation of this, it is common to provide a backup element to take over the data processing function of the first element should it fail. Thus, a failover function is provided.

A method of providing router redundancy in a wide area network is known. Each of two routers receives performance parameter data relating to the other router. If this data is not received when expected, or if the data indicates that a presently inactive router has a higher performance than an active router, the active router is switched to become the inactive router and vice versa.

It is desirable to provide improvements in relation to failover processing.

SUMMARY

According to first embodiments, there is provided a method of providing failover processing between a first element and a second element, the first element and the second element each being suitable for performing a data processing function in a data communications network, the method comprising:
  configuring a first channel and a second channel between the first and second elements, said first and second channels comprising different physical data paths;
  receiving at the first element, via the first channel, first data signals representative of functioning statuses of the second element, the first channel being configured to allow a non-optimal, partly functioning status of the second element to be communicated to the first element;
  receiving at the first element, via the second channel, second data signals representative of functioning statuses of the second element, the second channel being configured to allow a failed functioning status of the second element to be communicated to the first element; and
  conducting failover processing based on both the first and second data signals.

According to second embodiments, there is provided an element for performing a data processing function in a data communications network, the element being configured for providing failover processing, the element being configured to enable a first channel and a second channel to be connected to a further element, said first and second channels comprising different physical data paths, the element comprising:
  a first interface for receiving, via the first channel, first data signals representative of functioning statuses of the further element, the first channel being configured to allow a non-optimal, partly functioning status of the further element to be communicated to the first interface;
  a second interface for receiving, via the second channel, second data signals representative of functioning statuses of the second element, the second channel being configured to allow a failed functioning status of the second element to be communicated to the second interface; and
  a processor for conducting failover processing based on both the first and second data signals.

In accordance with third embodiments, there is provided a computer program product comprising a non-transitory computer-readable storage medium having computer readable instructions stored thereon, the computer readable instructions being executable by a computerized device to cause the computerized device to perform a method of providing failover processing between a first element and a second element, the first element and the second element each being suitable for performing a data processing function in a data communications network, the method comprising:
  configuring a first channel and a second channel between the first and second elements, said first and second channels comprising different physical data paths,
  receiving at the first element, via the first channel, first data signals representative of functioning statuses of the second element, the first channel being configured to allow a non-optimal, partly functioning status of the second element to be communicated to the first element;
  receiving at the first element, via the second channel, second data signals representative of functioning statuses of the second element, the second channel being configured to allow a failed functioning status of the second element to be communicated to the first element; and
  conducting failover processing based on both the first and second data signals.

DETAILED DESCRIPTION

Figure 1:
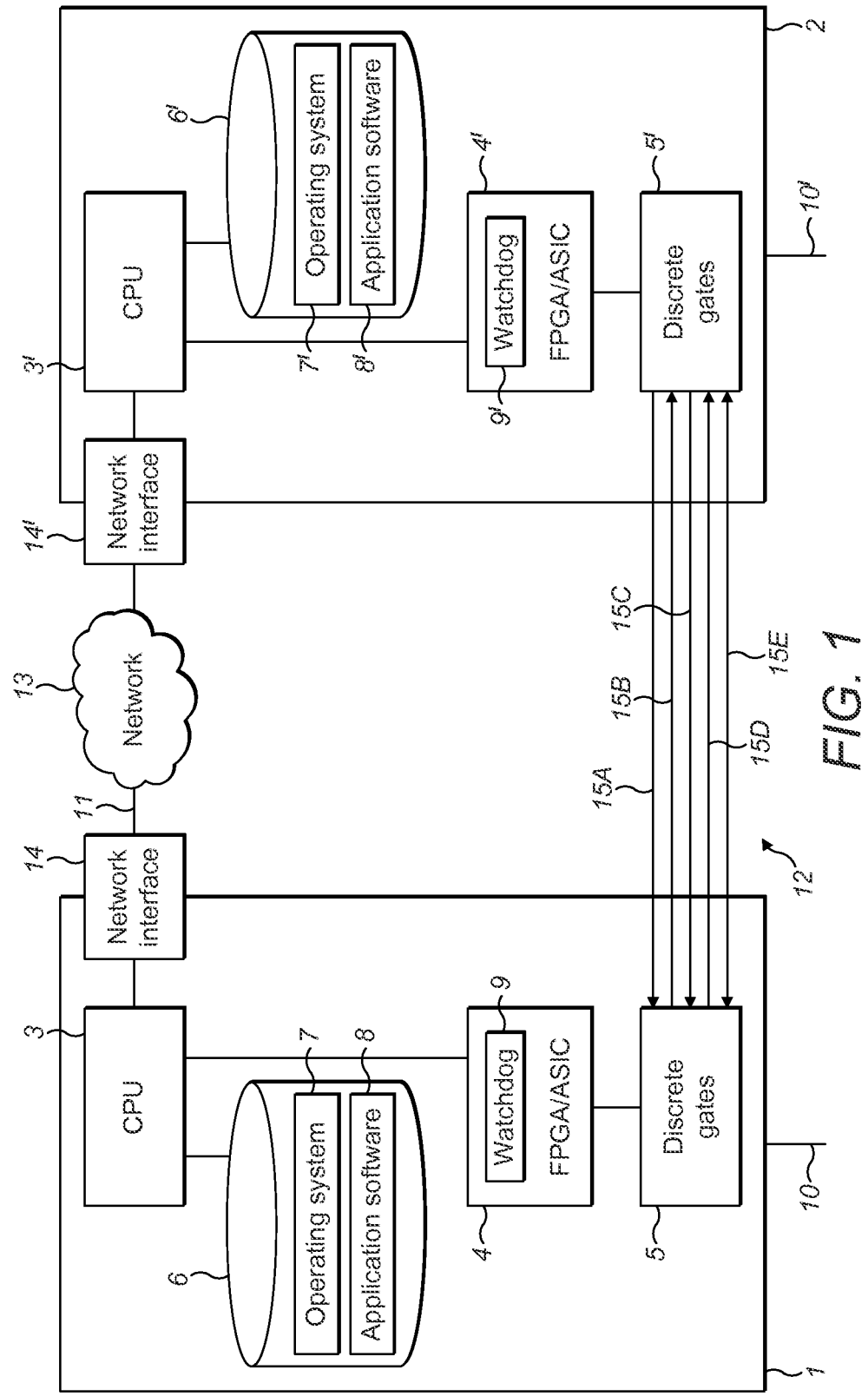
FIG. 1 shows schematically a first element and a second element according to an embodiment.

According to first embodiments, there is provided a method of providing failover processing between a first element and a second element, the first element and the second element each being suitable for performing a data processing function in a data communications network, the method comprising:
  configuring a first channel and a second channel between the first and second elements, said first and second channels comprising different physical data paths,
  receiving at the first element, via the first channel, first data signals representative of functioning statuses of the second element, the first channel being configured to allow a non-optimal, partly functioning status of the second element to be communicated to the first element;
  receiving at the first element, via the second channel, second data signals representative of functioning statuses of the second element, the second channel being configured to allow a failed functioning status of the second element to be communicated to the first element; and
conducting failover processing based on both the first and second data signals.

Hence, the combination of the first and second data signals to conduct failover processing, provides an effective failover function.

In an embodiment said second channel may be configured to be more reliable than said first channel. For example, the method may comprise configuring said second channel on one or more dedicated physical failover links and configuring said first channel on an Ethernet physical link. The first channel may allow for richer data signals, with greater granularity of indicating a functioning status, to be communicated for determining whether to trigger a failover. However, as a consequence, the first channel may be less reliable than the second channel. The second channel may allow simpler data signals with a lower granularity of indicating functioning status, to be communicated for determining whether to trigger a failover, thus making the second channel more reliable. The combination of the first and second channels provides a reliable failover function with a high granularity to identify a functioning status, and therefore effective failover processing.

In an embodiment, the method comprises conducting failover processing on the basis of a combination of said first and second data signals when both said first and second data signals are received simultaneously. Hence, it may be determined whether to trigger a failover on the basis of the functioning status indicated via the first and second channels.

In some embodiments, the method comprises comparing a non-optimal, partly functioning status of the first element with a non-optimal, partly functioning status of the second element communicated via the first channel, and determining whether to trigger a failover on the basis of said comparison. Hence, a failover may be triggered even if the first and second elements have a non-optimal, partly functioning status.

In an embodiment, the method comprises, whilst a failed functioning status of the second element is communicated via the second channel, and a non-optimal, partly functioning status of the second element is communicated via the first channel, comparing a functioning status of the first element with the non-optimal, partly functioning status of the second element, and determining whether to trigger a failover to said second element on the basis of said comparison, despite the failed status being communicated via said channel. Hence, a failover may be provided even if the element for failing over to has a non-optimal, partly functioning status.

In a further embodiment, the method comprises monitoring a processor of said first element and, if said processor fails, transmitting a data signal representative of a failed functioning status of the first element to the second element, via the second channel. Hence, a failover may be triggered on the basis of a component failure of the first element.

In another embodiment, the method comprises, whilst the first channel experiences a channel condition during which the first channel does not allow a non-optimal, partly functioning status of the second element to be communicated to the first element, receiving a data signal from the second element via the second channel to allow the first element to determine whether to trigger a failover to said second element.

The method may further comprise, whilst the first channel experiences the channel condition during which the first channel does not allow a non-optimal, partly functioning status of the second element to be communicated to the first element, and whilst a non-failed functioning status of the second element is communicated via the second channel to the first element in response to determining the first element to have a non-optimal, partly functioning status, determining to trigger a failover to said second element.

Further, the failover may be triggered by said first element by transmitting a data signal representative of a failed status of the first element to the second element, via the second channel.

In a different embodiment, the first channel experiences the channel condition during which the first channel does not allow a non-optimal, partly functioning status of the second element to be communicated to the first element, and whilst a failed functioning status of the second element is communicated via the second channel to the first element, the method comprises in response to determining the first element to have a non-optimal, partly functioning status, determining not to trigger a failover to said second element.

Yet further, in another embodiment, the method comprises, whilst the first channel experiences a channel condition during which the first channel does not allow a non-optimal, partly functioning status of the second element to be communicated to the first element, and during which the first channel allows a non-optimal, partly functioning status of the first element to be communicated to the second element transmitting a data signal from the first element representative of a non-optimal, partly functioning status of the first element via the second channel to allow the second element to determine whether to trigger a failover to said second element.

The method may further comprise, in response to the transmitted data signal, receiving from the second element, via the second channel, a data signal indicative of failover to the second element, the failover-indicative signal having been generated on the basis of comparing at the second element the non-optimal, partly functioning status of the first element with a functioning status of the second element.

Further, the method may comprise identifying an absence of receiving a first data signal via the first channel when receipt of said first data signal was expected, and identifying said channel condition at least partly on the basis of said identified absence.

The method may further comprise identifying an absence of receiving a second data signal via the second channel when receipt of said second data signal was expected, and identifying a channel condition during which the second channel does not allow a failed functioning status of the second element to be communicated to the first element, at least partly on the basis of said identified absence.

Thus, embodiments allow a failover to be provided despite a channel condition which limits communication of data signals representative of a functioning status of at least one of the first and second elements, via the first and/or second channels.

In embodiments, the second channel comprises a plurality of discrete physical failover links between the first element and the second element. Thus, the second channel is a reliable and robust communications channel.

In other embodiments, the method comprises using a field programmable gate array (FPGA) or application specific integrated circuit (ASIC) and receiving said second data signals via said FPGA or ASIC. Hence, a robust and reliable failover functionality may be provided.

According to another embodiment, the method comprises monitoring a functioning status of a processor on said first element using said FPGA or ASIC, and transmitting one or more second data signals via said second channel representative of the monitored functioning status of said processor.

Hence, a simple and effective failover functionality is provided should the processor of the first element fail.

In embodiments, said second data signals include one or more data signals representative of a request for failover. For example, said one or more data signals representative of a request for failover include at least one of: a signal indicative of requesting promotion of one of the first and second elements operating as a backup element to operate as a primary element, and a signal indicative of requesting demotion of the other one of the first and second elements operating as a primary element to operate as a backup element. Hence, a simple mechanism for triggering a failover is provided.

In other embodiments, said second data signals include a data signal representative of whether the second element is operating as a primary element or a backup element. Hence, a determination of whether to trigger a failover may be made on the basis of which one of the first and second elements is currently operating as the primary element and which one is operating as the backup element.

During the failover processing, the first element may be operating as the primary element and the second element may be operating as the backup element or the first element may be operating as the backup element and the second element may be operating as the primary element. Hence, it can be determined whether to trigger a failover whilst one of the first and second elements is operating as the primary element, thereby reducing where possible any interruption of a data processing function provided by the primary element.

In an embodiment, the first data signals transferred via the first channel may be more complex than the second data signals transferred via the second channel. Hence, a richer indication of the functioning status of the first and/or second element may be communication via the first channel compared with the second channel, giving a greater granularity for determining whether to trigger a failover.

The second data signals transferred via the second channel may comprise binary signals which change when a functioning status of one of the first and second elements changes. Hence, the second data signals are transferred using a simple, reliable and rapid format. In contrast, the first data signals transferred via the first channel may be communicated using an unreliable transport protocol such as User Datagram Protocol (UDP); hence, despite the unreliability, the first data signals provide a greater granularity to determine whether to trigger a failover.

According to an embodiment, the method comprises monitoring a functioning status of a plurality of components of the first element, and determining a functioning status of said first element at least partly on the basis of the monitored functioning statuses of the plurality of components. Hence, an accurate indication of the functioning status of the first element may be obtained, for determining whether to trigger a failover.

In another embodiment, the method comprises collating data identifying a functioning status of the plurality of components of the first element to generate a functioning status score to indicate a non-optimal, partly-functioning status of the first element. Hence, a functioning status of the first element may be represented in a simple and effective manner, for determining whether to trigger a failover.

According to second embodiments, there is provided an element for performing a data processing function in a data communications network, the element being configured for providing failover processing, the element being configured to enable a first channel and a second channel to be connected to a further element, said first and second channels comprising different physical data paths, the element comprising:

a first interface for receiving, via the first channel, first data signals representative of functioning statuses of the further element, the first channel being configured to allow a non-optimal, partly functioning status of the further element to be communicated to the first interface;

a second interface for receiving, via the second channel, second data signals representative of functioning statuses of the second element, the second channel being configured to allow a failed functioning status of the second element to be communicated to the second interface; and a processor for conducting failover processing based on both the first and second data signals.

In accordance with third embodiments, there is provided a computer program product comprising a non-transitory computer-readable storage medium having computer readable instructions stored thereon, the computer readable instructions being executable by a computerized device to cause the computerized device to perform a method of providing failover processing between a first element and a second element, the first element and the second element each being suitable for performing a data processing function in a data communications network, the method comprising:

configuring a first channel and a second channel between the first and second elements, said first and second channels comprising different physical data paths;

receiving at the first element, via the first channel, first data signals representative of functioning statuses of the second element, the first channel being configured to allow a non-optimal, partly functioning status of the second element to be communicated to the first element;

receiving at the first element, via the second channel, second data signals representative of functioning statuses of the second element, the second channel being configured to allow a failed functioning status of the second element to be communicated to the first element; and conducting failover processing based on both the first and second data signals.

Examples of embodiments will now be described in detail.

FIG. 1 illustrates schematically an example of a first element 1 and a second element 2, in accordance with a method of embodiments of providing failover processing between a first element and a second element. The first and second elements are each suitable for performing a data processing function in a data communications network, and may be for example routers, i.e. a first router and a second router. An embodiment will now be described.

The first and second elements 1, 2 are each operable as a primary element or as a backup element for performing the data processing function. Therefore, when one of the first and second elements operates as the primary element, the other of the first and second elements operates as the backup element.

The first element 1 comprises a central processing unit (CPU) 3 connected to a processor 4 such as a field programmable gate array (FPGA) or an application specific integrated circuit (ASIC), which is for receiving second data signals described below and which in turn is connected to at least one discrete gate 5.

The CPU 3 is for example controlled by software, stored in a memory store 6, including at least an operating system 7 and application software 8, the latter for example being for controlling collating and comparing of functioning statuses, described later. The processor 4 for example comprises a watchdog application 9, described further below.

The first element 1 has for example at least one connection 10 for receiving and/or transmitting data in the network, for the first element to perform its data processing function in the network. The first element may be switchable either to be connected in the network or disconnected from network, via the at least one connection 10, to determine, respectively, whether the first element is the primary element or the backup element. This switching may be provided using a relay switch (not illustrated) which may be controlled in dependence on whether or not a failover is triggered.

Features of the second element 2 are similar to features of the first element 1; for such features the same reference numeral will be used, with the addition of a prime (e.g. CPU 3' is a feature similar to CPU 3). Thus, similarly, the second element comprises a CPU 3' connected to a processor 4' such as a FPGA or an ASIC which in turn is connected to at least one discrete gate 5', and at least one connection 10'. The CPU is controlled by software stored in a memory store 6' including an operating system 7' and application software 8'. The processor 4' is provided with a watchdog application 9'. The second element is also adapted for switching to be connected to or disconnected from the network, for example using a relay switch as described before.

The first element 1 is connected to the second element 2 by a first channel 11 and a second channel 12, the first and second channels each having been configured according to the method of embodiments. The first and second channels comprise different physical data paths; in this example the first channel is configured on an Ethernet physical link and the second channel is configured on one or more dedicated physical failover links, which are a plurality of discrete physical failover links. Thus, the second channel may be configured to be more reliable than the first channel.

In this example the first channel 11 connects the CPU 3 of the first element 1 with the CPU 3' of the second element 2, via a network 13 and network interfaces 14, 14'. The second channel 12 in this example connects the processor 4 of the first element with the processor 4' of the second element, via the at least one discrete gate 5, 5'. The one or more dedicated physical failover links comprise in this example five links 15A, 15B, 15C, 15D, explained further below.

The CPUs 3, 3' are configured to communicate between the first and second elements, via the first channel, first data signals representative of functioning statuses of the first and/or second elements.

The processors 4, 4' are configured to communicate between the first and second elements, via the second channel, second data signals representative of functioning statuses of the first and/or second elements, and may transfer such second data signals to the CPU 3, 3' for conducting failover processing. Thus, the processor 4, 4' provides an interface, for example using a Peripheral Component Interconnect Express (PCIe) expansion bus and interrupts, for the CPU to interact with the second channel.

The first channel 11 is configured for communicating between the first and second elements first data signals representative of functioning statuses of the first and/or second elements, the first channel being configured to allow a non-optimal, partly functioning status of the second element to be communicated to the first and/or second element. The second channel 12 is configured for communicating between the first and second elements second data signals representative of functioning statuses of the first and second elements, the second channel being configured to allow a failed functioning status of the first and/or second element to be communicated to the first and/or second element.

A failed functioning status may correspond to a non-functioning status or a non-optimal, partly functioning status; and a non-failed functioning status may correspond to an optimal, fully functioning status. In other words, a "failed" functioning status may correspond to an "unhealthy" status and a non-failed functioning status may correspond to a "healthy" status.

In this example the second data signals are for example binary data signals which may change when a functioning status of one of the first and second elements changes, whereas the first data signals are more complex, rich data signals, using for example an unreliable transport protocol such as UDP.

Figure 3:
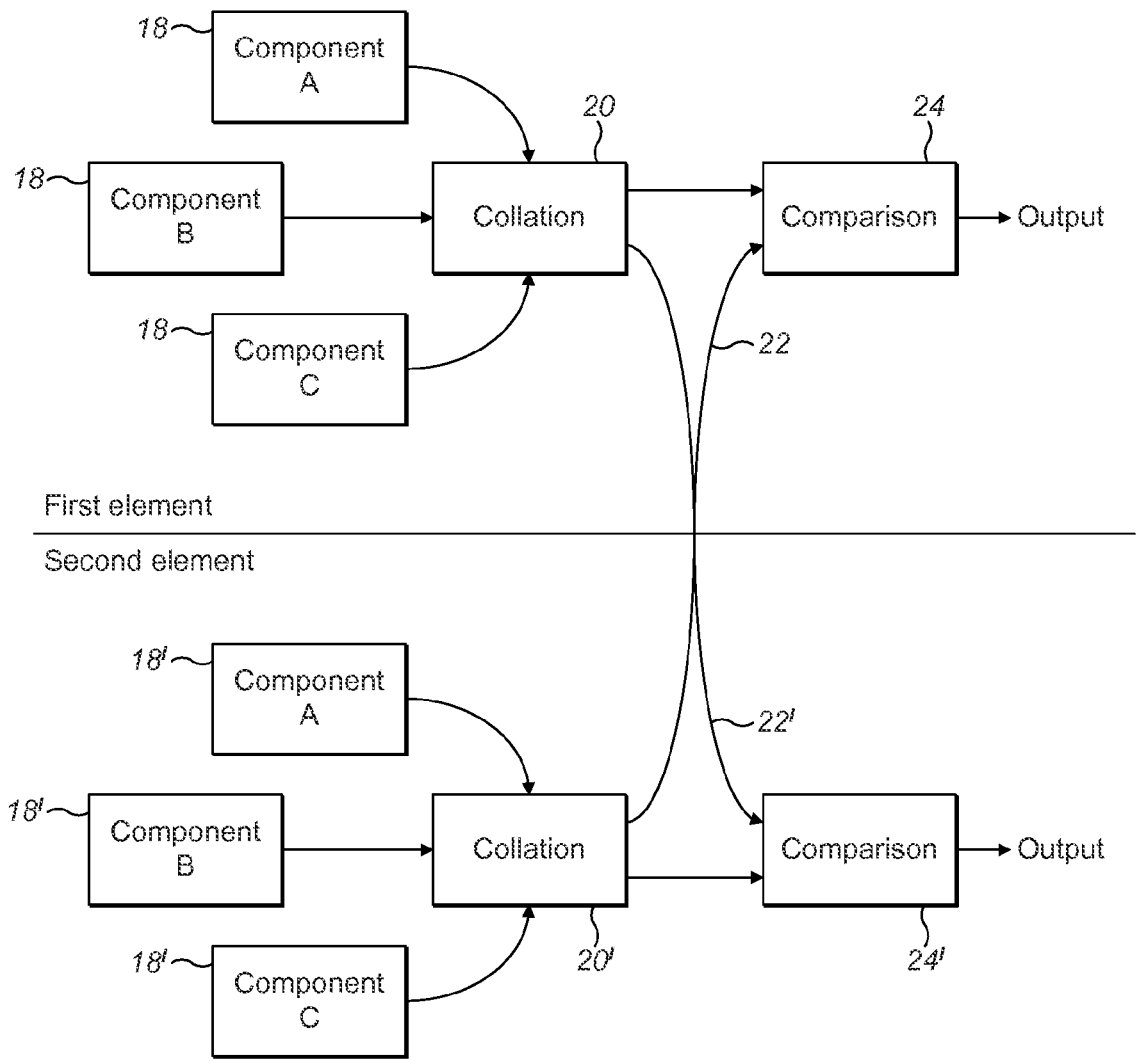
FIG. 3 shows schematically processing of functioning statuses according to an example.
Figure 4:
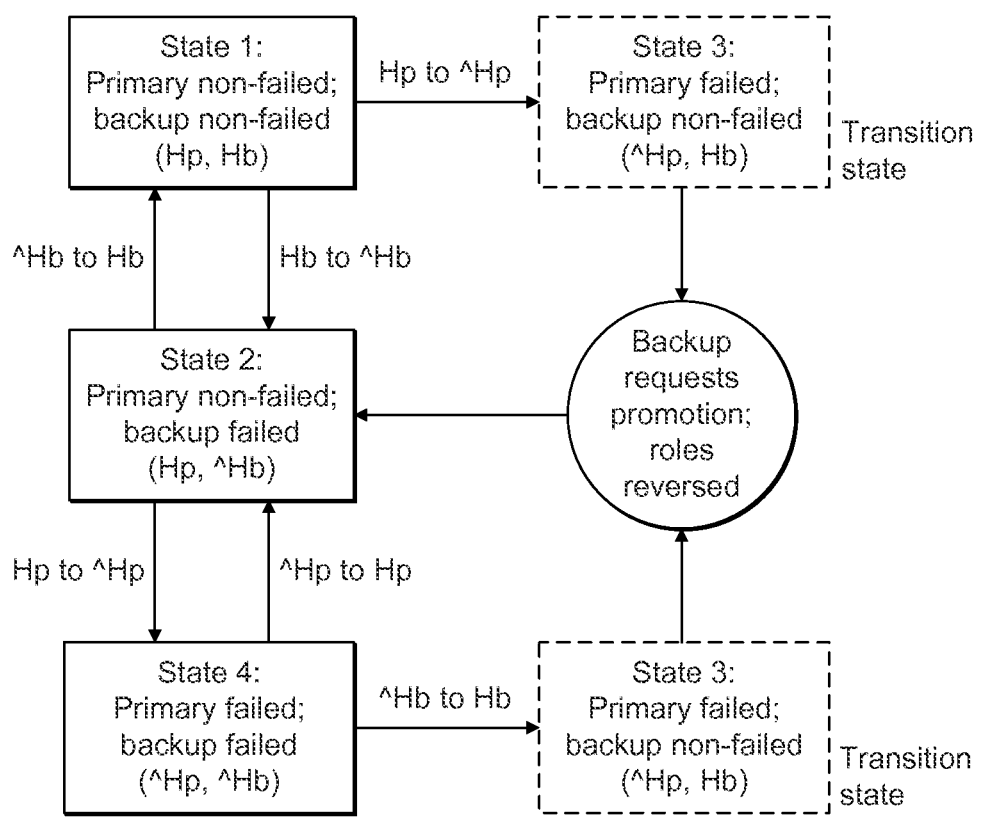
FIG. 4 illustrates a finite state machine (FSM) according to an example.

An embodiment of the method of providing failover processing will now be described with reference to FIGS. 2, 3 and 4.

This embodiment is described starting with the first element 1 as the primary element and the second element 2 as the backup element. This embodiment is described from the point of view of the first element, i.e. with the method occurring at the first element unless explicitly described otherwise. It is to be appreciated that a similar description would apply from the point of view of the second element in the case that the first element was operating as the backup element and the second element was operating as the primary element.

In this embodiment, the following data signals may be communicated via the first channel, for use determining whether to trigger a failover: first data signals representative of functioning statuses of the second element. In this embodiment the first data signals are representative of a functioning status score of the second element, indicative of whether the second element has a non-optimal, partly functioning status, or an optimal, fully functioning status. In this example the functioning status score is a percentage with 0% representing a non-functioning status, 100% representing an optimal, fully functioning status, and any functioning status scores between 0% and 100% representing a non-optimal, partly functioning status. The non-optimal, partly functioning status scores which the first channel is configured to communicate (along with the 0% non-functioning status score, and the 100% optimal, fully functioning status score), may be set with relatively high granularity, and regularly spacing throughout the range. In some embodiments there are at least 9 different non-optimal, partly functioning status scores between 0% and 100% (e.g. 10%, 20%, 30%, 40%, 50%, 60%, 70%, 80% and 90%); in other embodiments there are at least 99 different non-optimal, partly functioning status scores 0% and 100% (e.g. 1%, 2%, 3%, 4%, . . . 97%, 98% and 99%.)

In this embodiment, the following second data signals may be communicated via the second channel, for use in determining whether to trigger a failover:

a) second data signals representative of functioning statuses of the second element, in this embodiment whether the second element has a failed or a non-failed functioning status. A failed functioning status may be defined as a functioning status of less than a fully functioning status, or as a functioning status below a threshold determining a minimum functioning status which is acceptable for the second element to operate as a primary element. Second data signals communicated from the second element may be communicated via a first one 15A of the discrete physical failover links Second data signals communicated from the first element may be communicated via a second one 15B of the discrete physical failover links;

b) second data signals including one or more data signals representative of a request for failover, the one or more data signals representative of a request for failover including at least one of: a signal indicative of requesting promotion of one of the first and second elements operating as a backup element to operate as a primary element, and a signal indicative of requesting demotion of the other one of the first and second elements operating as a primary element to operate as a backup element; a third one 15C of the discrete physical failover links may be used for communicating a request for failover from the second element and a fourth one 15D of the discrete physical failover links may be used for communicating a request for failover from the first element; and c) second data signals including a data signal representative of whether the second element is operating as a primary element or a backup element, which data signal may be communicated via a fifth one 15E of the discrete physical failover links.

Figure 2:
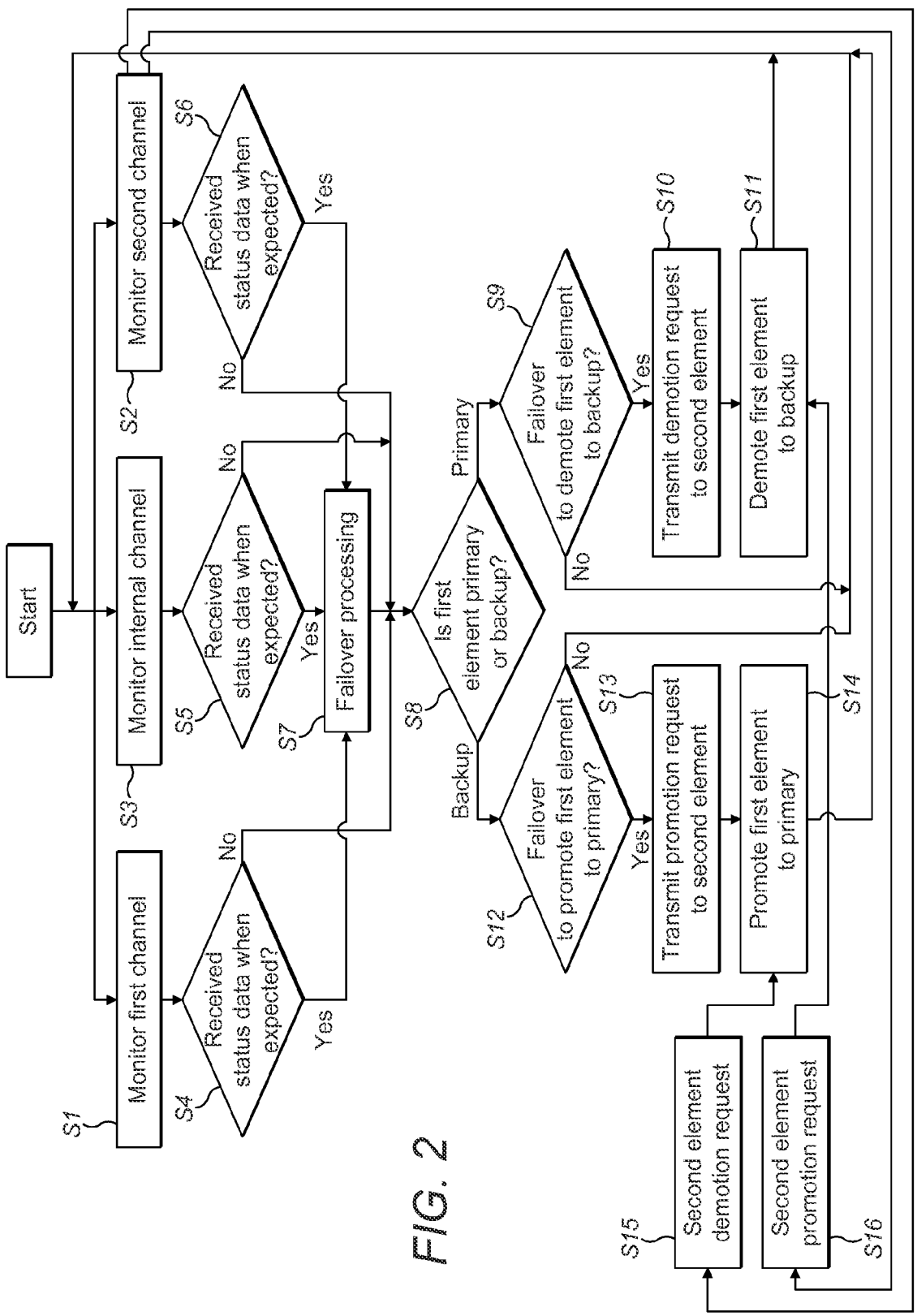
FIG. 2 shows a flow diagram of method steps according to an embodiment.

Referring to FIG. 2 which illustrates steps of this embodiment, the method includes in step S1, at the first element, monitoring the first channel for receipt of first data signals from the second element; such data signals being representative of functioning statuses of the second element. The monitoring is performed by the CPU 3, via the network interface 14. The monitoring includes receiving at the first element, via the first channel, such first data signals representative of functioning statuses of the second element. The method may further comprise identifying an absence of receiving such first data signals when receipt of such data signals from the second element was expected, where the second element transmits such first data signals regularly via the first channel, and identifying at least partly on the basis of the identified absence a channel condition during which the first channel does not allow a non-optimal, partly functioning status of the second element to be communicated to the first element.

The method includes in step S2, at the first element, in this example the processor 4, monitoring the second channel for receipt of second data signals representative of functioning statuses of the second element, namely second data signals a) referred to above which are representative of whether the second element has a failed functioning status or a non-failed functioning status. The monitoring in step S2 includes receiving data signals representative of functioning statuses of the second element. The method may in some embodiments further comprise identifying an absence of receiving such second data signals when receipt of such data signals from the second element was expected, where the second element transmits such second data signals regularly via the second channel, and identifying at least partly on the basis of the identified absence a channel condition during which the second channel does not allow a failed functioning status of the second element to be communicated to the first element.

In this example the method further includes in step S3, at the first element, monitoring at least one internal channel of the first element for receipt of one or more data signals representative of a functioning status of at least one component of the first element. In this example, this monitoring S3 comprises monitoring a processor of the first element, in this case the CPU 3. The processor 4 performs the monitoring via the connection between the CPU 3 and the processor 4. In this example, the CPU transmits regularly, for example every 10 milliseconds, a data signal for kicking the watchdog 9. If monitoring by the processor 4 identifies an absence of the regular data signal from the CPU, the processor 4 identifies a failed functioning status of the CPU and therefore of the first element.

The method further comprises in this example monitoring a functioning status of a plurality of components of the first element, and determining a functioning status of the first element at least partly on the basis of the monitored functioning statuses of the plurality of components, for use in the failover processing described below. This will be explained further below, with reference to FIG. 3.

As explained above, an absence of receipt of first data signals, second data signals, and/or data signals representative of a functioning status of at least one component of the first element may be identified if such data signals are transmitted regularly; any such absence is determined in steps S4, S5 and S6. If any such data signals are received but are not transmitted regularly, then the appropriate ones of steps S4, S5 and S6 are skipped.

Upon receipt during the monitoring in any of steps S1, S2 and S3 of first data signals, second data signals, and/or data signals representative of a functioning status of at least one component of the first element, respectively, these data signals are processed in step S7, thereby failover processing on the basis of both the first and second data signals may be conducted. The failover processing may be conducted on the basis of a combination of the first and second data signals when both the first and second data signals are received simultaneously. During at least part of the failover processing, the first element may be operating as the primary element and the second element may be operating as the backup element, or the first element may be operating as the backup element and the second element may be operating as the primary element.

On the basis of the failover processing, the method comprises determining whether to trigger a failover, in other words whether to switch the one of the first and second elements operating as the primary element to the backup element and to switch the other one of the first and second elements operating as the backup element to the primary element. The outcome of this determining depends on whether the first element is operating as the primary or backup element (step S8), which is known from the second data signal referred to above as second data signals c).

At step S9 a decision is made on whether to trigger a failover. Where the first element is the primary element, the determining of whether to trigger a failover follows the path from step S7 to step S9; if it is determined to trigger a failover, to demote the first element to operate as the backup element, a second data signal indicative of requesting demotion of the first element to operate as the backup element is generated and transmitted at step S10 to the second element via the second channel 12. On receipt of the demotion request the second element is promoted to operate as the primary element (not indicated in FIG. 2 as this occurs at the second element), by for example being switched to be connected to the network to perform the data processing function, as described previously. The first element is demoted from operating as the primary element to operate as the backup element in step S11, by for example being switched to be disconnected from the network, as described previously.

Alternatively, if it is determined not to trigger a failover, and therefore not to demote the first element to operate as the backup element, the method loops to the start.

It is to be understood that if the first element is operating as the backup element instead of the primary element, the method of the embodiment described above applies here also, with the exception that the method proceeds to step S12 after steps Si to S8. At step S12 a decision is made on whether to trigger a failover. Where the second element is the primary element, the determining of whether to trigger a failover follows the path from step S7 to step S12; if it is determined to trigger a failover, to promote the first element to operate as the primary element, a second data signal indicative of requesting promotion of the first element to operate as the primary element is generated and transmitted at step S13 to the second element via the second channel 12. On receipt of the promotion request the second element is demoted to operate as the backup element (not indicated in FIG. 2 as this occurs at the second element), by for example being switched to be disconnected from the network, as described previously. The first element is promoted from operating as the backup element to operate as the primary element in step S14, by for example being switched to be connected to the network, as described previously.

Alternatively, if it is determined not to trigger a failover, and therefore not to promote the first element to operate as the primary element, the method loops to the start.

The monitoring of the second channel S2 may include receiving from the second element a second data signal representative of a request for a failover; this may be receiving in step S15 a second data signal representative of a request to demote the second element from operating as the primary element to operate as the backup element, and in turn the first element is promoted to operate as the primary element in step S14 by for example switching the first element to be connected to the network; or, in the case that the second element is operating as the backup element, the receiving may be receiving in step S16 a second data signal representative of a request to promote the second element from operating as the backup element to operate as the primary element, and in turn the first element is demoted to operate as the backup element by for example switching the first element to be disconnected from the network. In further embodiments, second data signals representative of a request to demote the second element may not be used; instead, a failover may be triggered only by communicating second data signals representative of a promotion request via the second channel. By not using the demotion request functionality, the failover functionality may be more resilient.

As referred to above, and with reference to FIG. 3, monitoring of a functioning status of a plurality of components of the first element to will now be described according to an example. The CPU 3 monitors a plurality of components of the first element, for example a memory store component. In this example, the processor 4 is one of the plurality of components. Each component generates a data signal indicative of the functioning status of the component and transmits such data signals to the CPU 3; such data signals may also be referred to herein as component functioning status data signals, and may indicate a functioning status score such as a percentage, or a failed functioning status/non-failed functioning status, of a particular component. The component functioning status data signals may be generated by components having an in-built fault detection functionality. The CPU 3 processes the component functioning status data signals from each component, in this example by collating the component functioning statuses using a collation algorithm 20; in alternative embodiments a different processor than the CPU may be used to perform the collation. The processing by the CPU 3 may comprise identifying an absence of receiving a component functioning status data signal when receipt of such a data signal was expected; such an absence being identified using a watchdog for monitoring a functioning status data signal regularly transmitted by at least one component. In the absence of receipt of such a component functioning status data signal when expected, the CPU 3 may for example generate a functioning status indicative of a failed functioning status for that component, for use in the collation. Alternatively, each component may only generate and transmit a component functioning status data signal to the CPU when a status of that component changes; receipt of the revised component functioning status data signal may trigger the CPU to initiate the collation algorithm using for example newly requested component functioning status data signals from each component, or using the previously received component functioning status for each component which has not transmitted a revised component status data signal to the CPU.

A change in the functioning status score of the second element, indicated by the first data signals representative of a functioning status of the second element, may also trigger the collation algorithm to run on the first element, which may re-use previously collated component functioning statuses for the first element or trigger a request by the CPU 3 for new component functioning status data signals.

The collation algorithm may be a weighted sum algorithm, where a certain weighting value is assigned to a certain type of failure event, a function status and/or the function for each component; failure of some components may be more severe to functioning of the first element than the failure of other elements, and each failure event may therefore be assigned an appropriate weighting.

The collation in this case comprises summing the weighted value for each component. The sum value is then converted to a status score which in this example is a data signal representative of a functioning status of the first element, and in this example is a percentage with 0% representing a non-functioning status, 100% representing an optimal, fully functioning status, and any functioning status scores between 0% and 100% representing a non-optimal, partly functioning status. The functioning status scores, may be set with relatively high granularity, and regularly spacing throughout the range between the 0% non-functioning status score, and the 100% optimal, fully functioning status score. In some embodiments there are at least 9 different non-optimal, partly functioning status scores between 0% and 100% (e.g. 10%, 20%, 30%, 40%, 50%, 60%, 70%, 80% and 90%); in other embodiments there are at least 99 different non-optimal, partly functioning status scores 0% and 100% (e.g. 1%, 2%, 3%, 4%, ... 97%, 98% and 99%.)

In step S7, a first data signal representative of the functioning status of the first element, having been generated by the collation, is compared 24 with a first data signal representative of a functioning status of the second element, received via the first channel, and having been generated using a similar collation algorithm as described above for the first element. The comparing 24 is of the functioning status score percentages of the first and second elements to determine which of the first element and the second element has a more optimal functioning status. An output of the comparison is a data signal indicative of which of the first and second elements has a more optimal functioning status, which output is used to determine whether to trigger a failover, as described previously in relation to steps S7 to S14. The comparing may be comparing a non-optimal, partly functioning status of the first element with a non-optimal, partly functioning status of the second element communicated via the first channel, the method comprising determining whether to trigger a failover on the basis of the comparison.

The first data signal representative of the functioning status of the first element, generated in the collation, may also be transmitted via the first channel to the second element. This may happen as soon as the collation is complete, or in a different embodiment at the next regular time that transmission of such a data signal to the second element is due. Accordingly, the second element may also be comparing a functioning status of the first element with a functioning status of the second element, the latter having been generated by collation of functioning statuses from a plurality of components of the second element. The comparison in the second element is illustrated in FIG. 3, using the same reference numerals as before but with the addition of a prime.

In this example, determining whether to trigger a failover is based on a finite state machine (FSM). FSM 400 will now be described with reference to FIG. 4 and Table 1 below; the latter lists in rows different functioning states of the first and second elements, the states being indicated in FIG. 4, and the columns of Table 1 identify the different possible inputs to the FSM. The following notation will be used:

$H_p$ indicates the primary element;
$H_b$ indicates the backup element;
$\hat{H}$ indicates a failed functioning status;
$\downarrow$ indicates a transition to a failed functioning status;
$\uparrow$ indicates a transition to a non-failed functioning status;
A indicates an action that the backup element requests promotion; and
B indicates take no action (i.e. No Operation Performed (NOOP)).

TABLE 1

| | $H_p\downarrow$ | $H_b\downarrow$ | $H_p\uparrow$ | $H_b\uparrow$ | Notes |
|---|---|---|---|---|---|
| (1) Primary, Backup both non-failed $H_p, H_b$ | A Next state: (3) | B Next state: (2) | — | — | |
| (2) Primary non-failed, Backup failed $H_p, \hat{H}_b$ | B Next state: (4) | — | — | B Next state: (1) | |
| (3) Primary failed, Backup non-failed $\hat{H}_p, H_b$ | — | — | — | — | This state is a transition state. |
| (4) Primary, Backup both failed $\hat{H}_p, \hat{H}_b$ | — | — | B Next state: (2) | A Next state: (3) | |

The inputs, namely a transition to a non-failed or a failed functioning status of one of the primary and backup elements, i.e. at least one of $H_p\downarrow, H_b\downarrow, H_p\uparrow$ and $H_b\uparrow$, in this example are set by the second data signals sent over the status lines on the second channel. These are in turn set by failover processing of the first data signals sent over the first channel, if available.

It is to be noted that a tiebreaker situation may occur, where on the basis of the comparison the backup element has a more optimal functioning status than the primary element, but where the backup element has a non-optimal, partly functioning status. In such a situation, whilst a failed functioning status of the second element is communicated via the second channel, and a non-optimal, partly functioning status of the second element is communicated via the first channel, the method comprises comparing a functioning status of the first element with the non-optimal, partly functioning status of the second element, and determining whether to trigger a failover to the second element on the basis of the comparison, despite the failed status being communicated via the second channel.

Examples will now be described explaining whether or not a failover will be triggered, in accordance with an embodiment.

In a first example, the method comprises monitoring a processor of the first element and, if the processor fails, transmitting a data signal representative of a failed functioning status of the first element to the second element, via the second channel. Thus, if the CPU 3 of the first element fails, as identified by the watchdog 9 monitoring the CPU 3, the processor triggers a failover by generating and transmitting a failed functioning status of the first element to the second element, via the second channel.

In another example, the first channel may experience a channel condition during which the first channel does not allow a non-optimal, partly functioning status of the second element to be communicated to the first element, the method comprising receiving a data signal from the second element via the second channel to allow the first element to determine whether to trigger a failover to said second element.

In a further example, whilst the first channel experiences the channel condition during which the first channel does not allow a non-optimal, partly functioning status of the second element to be communicated to the first element, and whilst a non-failed functioning status of the second element is communicated via the second channel to the first element, the method comprises: in response to determining the first element to have a non-optimal, partly functioning status, determining to trigger a failover to said second element. The failover may be triggered by the first element by transmitting a data signal representative of a failed status of the first element to the second element, via the second channel.

In another example, the method comprises, whilst the first channel experiences the channel condition during which first channel does not allow a non-optimal, partly functioning status of the second element to be communicated to the first element, and whilst a failed functioning status of the second element is communicated via the second channel to the first element: in response to determining the first element to have a non-optimal, partly functioning status, determining not to trigger a failover to said second element.

In a further example, the method comprises, whilst the first channel experiences a channel condition during which the first channel does not allow a non-optimal, partly functioning status of the second element to be communicated to the first element, and during which the first channel allows a non-optimal, partly functioning status of the first element to be communicated to the second element: transmitting a data signal from the first element representative of a non-optimal, partly functioning status of the first element via the second channel to allow the second element to determine whether to trigger a failover to said second element. Further, the method may comprise: in response to the transmitted data signal, receiving from the second element, via the second channel, a data signal indicative of failover to the second element, the failover-indicative signal having been generated on the basis of comparing at the second element the non-optimal, partly functioning status of the first element with a functioning status of the second element.

The above embodiments are to be understood as illustrative examples. Further embodiments are envisaged. For example, the first data signals may instead of a percentage score provide a greater granularity of a functioning status of the first and/or second elements than offered by a percentage. Alternative data formats may be used than the first and/or second data signals described above.

Figure 5:
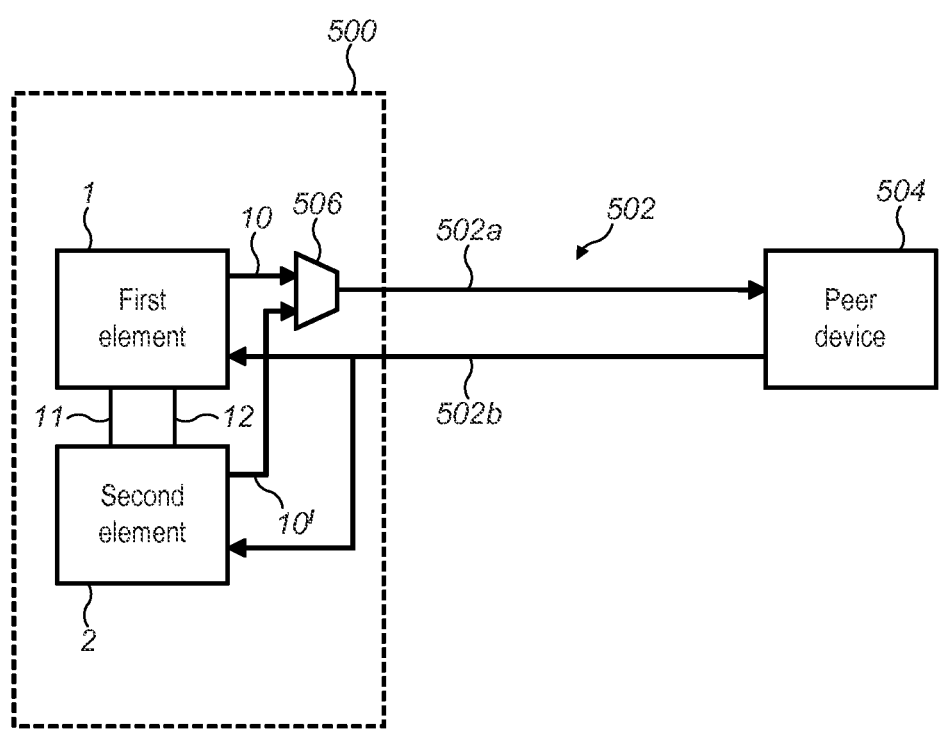
FIG. 5 illustrates a portion of an example data communications network according to an embodiment.

An example of an application of the method of embodiments will now be described. FIG. 5 shows a portion of an example data communications network according to embodiments, wherein the first element 1 and the second element 2 are comprised by network entity 500, which may be a switch, router, server etc. The first and second elements 1, 2 serve to provide redundancy in the operation of network entity 500, and are each operable as the primary or as the backup element, as described previously in relation to FIG. 1.

Network entity 500 communicates in the data communications network via communications link 502 with a peer device 504 in the data communications network, such as a router, switch or gateway entity. The first element 1 and the second element 2 are configured to transmit data via connections 10 and 10' respectively. In the embodiment illustrated, connections 10 and 10' serve to connect the first and second elements 1, 2 to a selection device 506. Selection device 506 is configured to select the data transmitted from either the first element 1, or the second element 2 for transmission to the peer device 504 via communications link part 502a.

According to some embodiments, the selection device 506 is initially configured to select the data transmitted from the first element 1, via connection 10, for transmission to the peer device 504 via communications link part 502a. Hence, the first element 1 is operating as the primary element, with the second element 2 acting as the backup element. Subsequently, it is determined to be preferable to change the first element 1 to act as the backup element, and to change the second element 2 to act as the primary element. In other words, a failover is triggered. Upon triggering the failover, the selection device 506, is re-configured to select the data transmitted from the second element 2, via connection 10', for transmission to the peer device 504 via communications link 502a.

In order to effectively operate as the primary element, the second element 2 requires an accurate record of the configuration or 'state' of primary element 1 at the point the failover was triggered. An element's state may include a number of parameters that are used in processing received data, or generating transmitted data. In some embodiments, regardless of which element is the primary element, both first element 1 and second element 2 receive inbound data from the peer device via communication link 502b, and hence are able to maintain the same state independently. In such embodiments, the second element 2 may begin operating as the primary element immediately upon the failover being triggered.

In other embodiments, while acting as primary, the first element 1 may periodically report its state to the 'backup' second element 2, which in turn replicates the reported state. This replication process could occur via the first channel 11, or via a further communication channel, not shown. In such embodiments, when a failover is triggered, the second element 2 will have a somewhat up-to-date state, allowing largely efficient operation as the primary element to begin immediately.

In further embodiments, upon a failover being triggered, the second element 2 may require initialisation before it can begin operating as the primary element. On initialisation, a replication process is initiated between the first element 1 and the second element 2 in order to transfer state from first element 1 to second element 2. This is commonly referred to as "catch-up" replication. Again, replication could occur via communication channel 11, or via a further communication channel, not shown.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. A method of providing failover processing between a first element and a second element, the first element and the second element each being suitable for performing a data processing function in a data communications network, the method comprising:

configuring a first channel and a second channel between the first and second elements, said first and second channels comprising different physical data paths;

receiving at the first element, via the first channel, first data signals representative of functioning statuses of the second element, the first channel being configured to allow a non-optimal, partly functioning status of the second element to be communicated to the first element;

receiving at the first element, via the second channel, second data signals representative of functioning statuses of the second element, the second channel being configured to allow a failed functioning status of the second element to be communicated to the first element; and conducting failover processing based on both the first and second data signals.

2. The method according to claim 1, wherein said second channel is configured to be more reliable than said first channel.

3. The method according to claim 2, further comprising configuring said second channel on one or more dedicated physical failover links and configuring said first channel on an Ethernet physical link.

4. The method according to claim 1, further comprising conducting failover processing on the basis of a combination of said first and second data signals when both said first and second data signals are received simultaneously.

5. The method according to claim 1, further comprising comparing a non-optimal, partly functioning status of the first element with a non-optimal, partly functioning status of the second element communicated via the first channel, and determining whether to trigger a failover on the basis of said comparison.

6. The method according to claim 1, further comprising, whilst a failed functioning status of the second element is communicated via the second channel, and a non-optimal, partly functioning status of the second element is communicated via the first channel, comparing a functioning status of the first element with the non-optimal, partly functioning status of the second element, and determining whether to trigger a failover to said second element on the basis of said comparison, despite the failed status being communicated via said second channel.

7. The method according to claim 1, further comprising monitoring a processor of said first element and, if said processor fails, transmitting a data signal representative of a failed functioning status of the first element to the second element, via the second channel.

8. The method according to claim 1, further comprising, whilst the first channel experiences a channel condition during which the first channel does not allow a non-optimal, partly functioning status of the second element to be communicated to the first element, receiving a data signal from the second element via the second channel to allow the first element to determine whether to trigger a failover to said second element.

9. The method according to claim 8, further comprising, whilst the first channel experiences the channel condition during which the first channel does not allow a non-optimal, partly functioning status of the second element to be communicated to the first element, and whilst a non-failed functioning status of the second element is communicated via the second channel to the first element, in response to determining the first element to have a non-optimal, partly functioning status, determining to trigger a failover to said second element.

10. The method according to claim 9, wherein failover is triggered by said first element by transmitting a data signal representative of a failed status of the first element to the second element, via the second channel.

11. The method according to claim 8, further comprising, whilst the first channel experiences the channel condition during which the first channel does not allow a non-optimal, partly functioning status of the second element to be communicated to the first element, and whilst a failed functioning status of the second element is communicated via the second channel to the first element, in response to determining the first element to have a non-optimal, partly functioning status, determining not to trigger a failover to said second element.

12. The method according to claim 8, further comprising identifying an absence of receiving a first data signal via the first channel when receipt of said first data signal was expected, and identifying said channel condition at least partly on the basis of said identified absence.

13. The method according to claim 1, further comprising, whilst the first channel experiences a channel condition during which the first channel does not allow a non-optimal, partly functioning status of the second element to be communicated to the first element, and during which the first channel allows a non-optimal, partly functioning status of the first element to be communicated to the second element, transmitting a data signal from the first element representative of a non-optimal, partly functioning status of the first element via the second channel to allow the second element to determine whether to trigger a failover to said second element.

14. The method according to claim 13, further comprising, in response to the transmitted data signal, receiving from the second element, via the second channel, a data signal indicative of failover to the second element, the failover-indicative signal having been generated on the basis of comparing at the second element the non-optimal, partly functioning status of the first element with a functioning status of the second element.

15. The method according to claim 1, wherein the second channel comprises a plurality of discrete physical failover links between the first element and the second element.

16. The method according to claim 1, further comprising using a field programmable gate array (FPGA) or application specific integrated circuit (ASIC) and receiving said second data signals via said FPGA or ASIC.

17. The method according to claim 16, further comprising monitoring a functioning status of a processor on said first element using said FPGA or ASIC, and transmitting one or more second data signals via said second channel representative of the monitored functioning status of said processor.

18. The method according to claim 1, wherein said second data signals include one or more data signals representative of a request for failover.

19. The method according to claim 18, wherein said one or more data signals representative of a request for failover include at least one of: a signal indicative of requesting promotion of one of the first and second elements operating as a backup element to operate as a primary element, and a signal indicative of requesting demotion of the other one of the first and second elements operating as a primary element to operate as a backup element.

20. The method according to claim 1, wherein said second data signals include a data signal representative of whether the second element is operating as a primary element or a backup element.

21. The method according to claim 1, wherein the first element operates as the primary element and the second element operates as the backup element during at least part of said failover processing.

22. The method according to claim 1, wherein the first element operates as the backup element and the second element operates as the primary element during at least part of said failover processing.

23. The method according to claim 1, wherein the first data signals transferred via the first channel are more complex than the second data signals transferred via the second channel.

24. The method according to claim 1, wherein the second data signals transferred via the second channel comprise binary signals which change when a functioning status of one of the first and second elements changes.

25. The method according to claim 1, wherein the first data signals transferred via the first channel are communicated using an unreliable transport protocol.

26. The method according to claim 1, further comprising monitoring a functioning status of a plurality of components of the first element, and determining a functioning status of said first element at least partly on the basis of the monitored functioning statuses of the plurality of components.

27. A method according to claim 26, further comprising collating data identifying a functioning status of the plurality of components of the first element to generate a functioning status score to indicate a non-optimal, partly-functioning status of the first element.

28. The method according to claim 1, further comprising identifying an absence of receiving a second data signal via the second channel when receipt of said second data signal was expected, and identifying a channel condition during which the second channel does not allow a failed functioning status of the second element to be communicated to the first element, at least partly on the basis of said identified absence.

29. An element for performing a data processing function in a data communications network, the element being configured for providing failover processing, the element being configured to enable a first channel and a second channel to be connected to a further element, said first and second channels comprising different physical data paths, the element comprising:
    a first interface for receiving, via the first channel, first data signals representative of functioning statuses of the further element, the first channel being configured to allow a non-optimal, partly functioning status of the further element to be communicated to the first interface;
    a second interface for receiving, via the second channel, second data signals representative of functioning statuses of the second element, the second channel being configured to allow a failed functioning status of the second element to be communicated to the second interface; and
    a processor for conducting failover processing based on both the first and second data signals.

30. A computer program product comprising a non-transitory computer-readable storage medium having computer readable instructions stored thereon, the computer readable instructions being executable by a computerized device to cause the computerized device to perform a method of providing failover processing between a first element and a second element, the first element and the second element each being suitable for performing a data processing function in a data communications network, the method comprising:
    configuring a first channel and a second channel between the first and second elements, said first and second channels comprising different physical data paths,
    receiving at the first element, via the first channel, first data signals representative of functioning statuses of the second element, the first channel being configured to allow a non-optimal, partly functioning status of the second element to be communicated to the first element; and receiving at the first element, via the second channel, second data signals representative of functioning statuses of the second element, the second channel being configured to allow a failed functioning status of the second element to be communicated to the first element; and conducting failover processing based on both the first and second data signals.

* * * * *